US010040964B2

(12) United States Patent
Luebke et al.

(10) Patent No.: US 10,040,964 B2
(45) Date of Patent: Aug. 7, 2018

(54) USE OF TRISTYRYLPHENOL ALKOXYLATE SULFOSUCCINATES IN EMULSION POLYMERIZATION AND COATINGS

(71) Applicant: Stepan Company, Northfield, IL (US)

(72) Inventors: Gary Luebke, Chicago, IL (US); Keith Reschak, Palatine, IL (US); Renee Luka, Park Ridge, IL (US); Jarrod Kaltenbach, Chagrin Falls, OH (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 15/228,783

(22) Filed: Aug. 4, 2016

(65) Prior Publication Data

US 2016/0340526 A1 Nov. 24, 2016

Related U.S. Application Data

(63) Continuation of application No. PCT/US2015/015115, filed on Feb. 10, 2015.

(60) Provisional application No. 61/939,043, filed on Feb. 12, 2014.

(51) Int. Cl.

| C08F 2/26 | (2006.01) |
|---|---|
| C09D 133/06 | (2006.01) |
| C08F 2/36 | (2006.01) |
| C08F 220/18 | (2006.01) |
| C09D 5/02 | (2006.01) |
| C09D 133/02 | (2006.01) |
| C09J 133/02 | (2006.01) |
| C09D 7/63 | (2018.01) |
| C08K 5/42 | (2006.01) |

(52) U.S. Cl.
CPC ............ *C09D 133/062* (2013.01); *C08F 2/26* (2013.01); *C08F 2/36* (2013.01); *C08F 220/18* (2013.01); *C09D 5/02* (2013.01); *C09D 5/027* (2013.01); *C09D 7/63* (2018.01); *C09D 133/02* (2013.01); *C09J 133/02* (2013.01); *C08K 5/42* (2013.01)

(58) Field of Classification Search
CPC ........ C08K 5/42; C08F 220/06; C08F 220/14; C08F 220/18; C08F 2220/1825; C08F 2220/1858; C08F 2/26; C08F 2/36; C09D 133/02; C09D 133/062; C09D 5/027; C09D 7/1233; C09J 133/02
See application file for complete search history.

(56) References Cited

U.S. PATENT DOCUMENTS

| 8,492,465 B2 | 7/2013 | Seibold et al. |
| 2002/0131949 A1 | 9/2002 | George et al. |
| 2005/0010009 A1 | 1/2005 | Schultz et al. |
| 2007/0214999 A1 | 9/2007 | Meyer et al. |
| 2009/0145329 A1* | 6/2009 | Miyamoto ............ C08L 53/02 106/218 |
| 2011/0086961 A1 | 4/2011 | Zong et al. |
| 2011/0144248 A1 | 6/2011 | Zong et al. |

FOREIGN PATENT DOCUMENTS

| CN | 101146884 A * | 3/2008 | |
| CN | 102924646 | 2/2013 | |
| DE | 19752435 | 5/1999 | |
| DE | 19752435 A1 * | 5/1999 | ............ C08F 212/04 |
| WO | WO2007/117512 | 10/2007 | |

OTHER PUBLICATIONS

DE 19752435 A1, May 1999, Derwent Ab.*
CN 101146884 A, Mar. 2008, English Ab.*
Supplementary European Search Report in Application No. EP 15 74 8591, dated Sep. 4, 2017.
International Search Report and Written Opinion, dated May 14, 2015, in International application No. PCT/US2015/15115, filed Feb. 10, 2015.
International Preliminary Report, dated Aug. 25, 2016, in International Application No. PCT/US2015/015115, filed Feb. 10, 2015.
Notification of the First Office Action for patent application No. 201580008582.0, dated Dec. 4, 2017.

* cited by examiner

*Primary Examiner* — Satya Sastri
(74) *Attorney, Agent, or Firm* — McAndrews, Held & Malloy, Ltd.

(57) ABSTRACT

Disclosed are the use of novel surfactants for the synthesis of emulsion polymer latexes, particularly those used in paints, coatings, and pressure sensitive adhesives. The surfactant compositions for emulsion polymer latexes comprise sterically bulky surfactants whose composition comprises at least one alkoxylated polyaryl substituted aromatic sulfosuccinate compound. The novel surfactants provide for the production of stable, small particle size distribution emulsion polymer latexes. The resulting latexes, when formulated into latex paint, impart improvements in water resistance as measured by film opacity, blister resistance and improved leveling characteristics, and when formulated into pressure sensitive adhesives, provide improved water resistance characteristics as measured by film opacity.

16 Claims, 1 Drawing Sheet

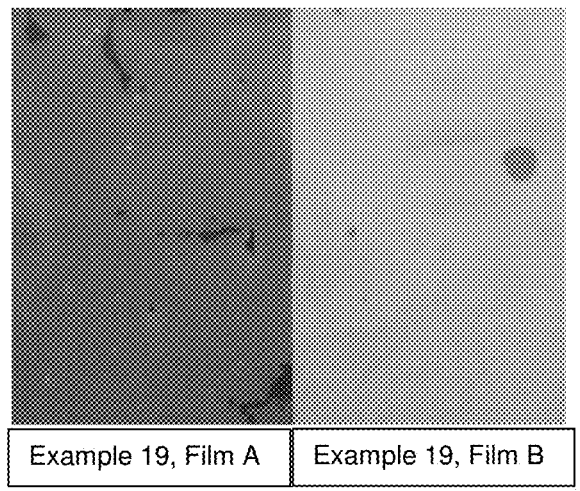

USE OF TRISTYRYLPHENOL ALKOXYLATE SULFOSUCCINATES IN EMULSION POLYMERIZATION AND COATINGS

CROSS-REFERENCE TO RELATED APPLICATIONS

This application is a continuation of and claims priority to PCT Patent Application PCT/US2015/015115 having an International filing date of Feb. 10, 2015, which claims priority to U.S. Provisional Application No. 61/939,043, filed Feb. 12, 2014. The contents of the applications referred to above are hereby incorporated by reference.

BACKGROUND OF THE INVENTION

Emulsion polymerization can be used to produce polymer dispersions in water, more commonly referred to as latexes. Polymer latexes are used in many applications such as adhesives, carpet backing, caulks, coatings, elastomers, paints and packaging. Latexes are typically stable colloidal suspensions of polymer particles in water. When the particles are sufficiently small they can be individually stabilized through the use of surfactants and kept dispersed through Brownian motion.

The emulsion polymerization process can be performed in an aqueous medium in the presence of a surfactant or combination of surfactants. Surfactants play a role in both the formation of emulsion polymer latexes and in stabilizing the final polymer dispersion. Water soluble free radical initiators such as ammonium, sodium, or potassium persulfate can be used to rapidly produce high molecular weight polymers at relatively high solids content and low viscosity. The process requires the emulsification of the monomers in the aqueous phase through the use of surfactants. Other ingredients used in the emulsion polymerization process may include buffers and chain transfer agents and minor amounts of polymerizable acids such as acrylic acid, methacrylic acid, or itaconic acid. Since the surfactant cannot be easily removed from the final latex, normally remaining imbedded in the polymer matrix, the quantity and type of surfactant used can determine many of the characteristics of the latex and performance characteristics in a final application.

The surfactants remaining in a latex can have deleterious effects in the final application. For example, water sensitivity and poor adhesion can be caused by the migration of surfactants within a dried polymer matrix. Surfactants can migrate to form domains within the polymer matrix as well as migrate to surfaces and interfaces. Surfactant domains at the surface can lead to the formation of micro-voids that can leave the polymer film vulnerable to the penetration of moisture leading to water sensitivity and degradation of polymer film strength. The presence of surfactant at the polymer-substrate interface can lead to reductions in adhesive strength.

Attempts to minimize the adverse effects of surfactants in emulsion polymer applications have resulted in surfactants that become incorporated within a latex through covalent bonds, or through a combination of covalent and ionic interactions. Such "polymerizable surfactants" include surfmers and non-migrating surfactants. However, the use of polymerizable surfactants can present difficulties in the polymerization process such as their tendency to form coagulum. Therefore, a need remains for alternative systems that mitigate the problems associated with surfactants mobility while providing increased water resistance and improvements in properties such as block resistance, adhesion, optical clarity, leveling and freeze-thaw.

BRIEF SUMMARY OF THE INVENTION

The disclosure relates to surfactant-containing compositions for use in synthesis of emulsion polymer latexes. Such latexes can be used in coatings, paints, and adhesives, among other applications. For example, the surfactant compositions can be used in low glass transition temperature emulsion polymer latex compositions, such as those used to formulate low VOC latex paints, and high glass transition temperature emulsion polymer latex compositions, such as those used in coating compositions and other compositions employing surfactants.

In one aspect, the disclosure provides emulsions comprising:
(a) water;
(b) at least one radical-polymerizable monomer;
(c) a surfactant of one or more compounds defined by formula (I),

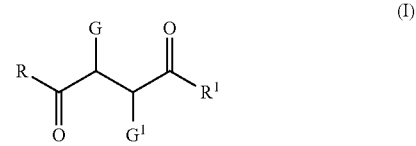

(I)

or a salt thereof, wherein
one of G and $G^1$ is —$SO_3M$ and the other is hydrogen, wherein M is hydrogen or a metal cation (e.g., $Na^+$);
R is —OH, —$R^1$, or —$R^3$; wherein
each $R^1$ is independently -L-$R^2$, wherein
$R^2$ is

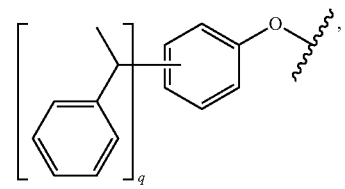

wherein q is 1, 2, or 3, or a mixture thereof;
each L is independently —(OCH($CH_3$)$CH_2$)$_n$—(OCH$_2$CH$_2$)$_m$—*
or —(OCH$_2$CH$_2$)$_m$—(OCH($CH_3$)$CH_2$)$_n$—*, wherein $R^2$ is attached to L at the *; and
n and m are each between 0 and 100, provided that at least one of m and n is greater than or equal to 1; and
$R^3$ is -L-$OR^4$ or $C_{1-30}$ alkoxy, wherein —$OR^4$ is attached to L at the * and $R^4$ is hydrogen or $C_{1-4}$ alkyl.

In another aspect, the present disclosure provides processes for preparing an emulsion polymer latex comprising, polymerizing a monomer emulsion in the presence of an initiator to form an emulsion polymer latex, wherein the monomer emulsion comprises:
(i) water,
(ii) at least one radical-polymerizable monomer; and
(iii) a surfactant of one or more compounds defined by formula (I), above.

In another aspect, the present disclosure provides the emulsion polymer latexes prepared according to the preceding aspect.

In another aspect, the present disclosure provides latex paints comprising polymeric latex particles that comprise a surfactant of one or more compounds defined by formula (I), above.

In another aspect, the present disclosure provides pressure-sensitive adhesives comprising polymeric latex particles that comprise a surfactant of one or more compounds defined by formula (I), above.

At least one aspect of the presently described technology provides latex paint formulations having reduced coagulum and/or improved water resistance, blister resistance, and leveling characteristics.

At least one further aspect of the presently described technology provides pressure-sensitive adhesive latexes having improved water resistance characteristics.

Further details and embodiments are disclosed in the discussion of the detailed description below.

BRIEF DESCRIPTION OF THE DRAWINGS

FIG. 1 shows a comparison between a latex film made from a latex comprising a surfactant of the present technology, and a latex film made from a latex comprising a surfactant of the prior art.

DETAILED DESCRIPTION OF THE INVENTION

The presently described technology is distinct from polymerizable surfactants such as surfmers in that the surfactants are not covalently or ionically bound to a polymer. The surfactants described in this disclosure do not rely on a contained (i.e., covalently or ionically bound) reactive moiety. Thus, the surfactants described below present fewer difficulties in handling, and can be less expensive than polymerizable surfactants. Further, latexes made using the surfactants described herein may be easier to formulate since the surface activity of the included surfactants is attenuated and less likely to interfere/compete with surfactants added for other purposes, such as dispersion aids, rheology modifiers, flow and leveling agents, anti-foaming agents, freeze-thaw and calcium ion stabilizers, and other additives with surface activity.

In particular, emulsion polymer latexes can be prepared by polymerizing a monomer emulsion in the presence of an initiator to form the emulsion polymer latex. The monomer emulsion can comprise (i) water, (ii) at least one radical-polymerizable monomer; and (iii) a surfactant. In general, the surfactant is one or more compounds according to formula (I),

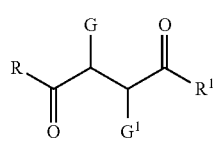
(I)

or a salt thereof, wherein one of G and $G^1$ is —$SO_3M$ and the other is hydrogen, wherein M is hydrogen or a metal cation (e.g., Na);

R is —OH, —$R^1$, or —$R^3$; wherein
each $R^1$ is independently -L-$R^2$, wherein
$R^2$ is

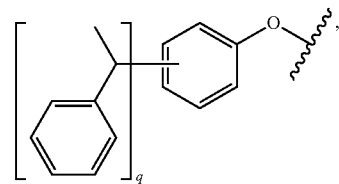

wherein q is 1, 2, or 3, or a mixture thereof;
each L is independently —(OCH($CH_3$)$CH_2$)$_n$—(OCH$_2$CH$_2$)$_m$—*
or —(OCH$_2$CH$_2$)$_m$—(OCH($CH_3$)$CH_2$)$_n$—*,
wherein $R^2$ is attached to L at the *; and
n and m are each between 0 and 100, provided that at least one of
m and n is greater than or equal to 1; and
$R^3$ is -L-$OR^4$ or $C_{1-30}$ alkoxy, wherein —$OR^4$ is attached to L at the * and $R^4$ is hydrogen or $C_{1-4}$ alkyl. One of the ester substituents could be C1 to C30 alcohol or C1 to C30 alkoxylate (EO, PO or EO+PO).

In one embodiment, the surfactant of formula (I) is one or more compounds according to formula (II),

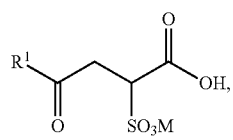
(II)

or a salt thereof.

In another embodiment, the surfactant of formula (I) is one or more compounds according to formula (III),

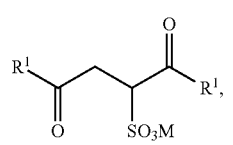
(III)

or a salt thereof, wherein both $R^1$ groups are the same.

In another embodiment, the surfactant of formula (I) is one or more compounds according to formula (IVa) or (IVb),

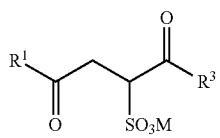
(IVa)

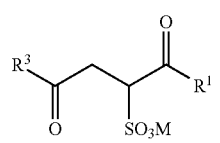
(IVb)

a mixture thereof, or a salt thereof.

The surfactants of formula (I) can be prepared by reacting a monostyrylphenol, distyrylphenol, or tristyrylphenol alkoxylate, or a mixture thereof (i.e., a compound of the formula $R^2$-L-H, as defined above, wherein q is 1, 2, or 3, or mixture thereof) with maleic anhydride at a temperature suitable to open the anhydride ring (e.g., at 100° C.) to form a half-ester intermediate of the formula

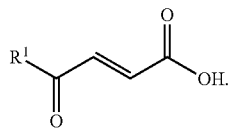

In another example, a surfactant of formula (I) can be prepared by reacting a monostyrylphenol, distyrylphenol, or tristyrylphenol alkoxylate, or a mixture thereof (i.e., a compound of the formula $R^2$-L-H, as defined above) with maleic anhydride at a temperature suitable to open the ring and split off 1 mole of water (e.g., at 180° C.) to form the diester intermediate of the formula

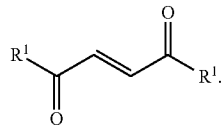

Alternatively, the half-ester intermediate can be reacted with an alcohol of the formula $R^3$—H at a temperature suitable to split off 1 mole of water (e.g., at 180° C.) to form the mixed diester intermediate of the formula

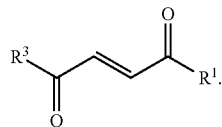

As would be clear to one skilled in the art, for the mixed diester, the order of preceding reactions could be reversed such that maleic anhydride is first reacted with $R^3$—H, then the half ester reacted with $R^2$-L-H. In either example, the half-ester, diester, or mixed diester intermediate can be reacted with sodium bisulfite to form the surfactant according to formula (I).

In an embodiment of any of the surfactants of formulae (I)-(IV), M is an alkali metal cation or alkali earth metal cation. In another embodiment of any of the surfactants of formulae (I)-(IV), M is $Li^+$, $Na^+$, or $K^+$. In another embodiment of any of the surfactants of formulae (I)-(IV), M is $Na^+$.

In an embodiment of any of the surfactants of formulae (I)-(IV), $R^1$ is —$(OCH(CH_3)CH_2)_n$—$(OCH_2CH_2)_m$—$R^2$. In another embodiment of any of the surfactants of formulae (I)-(IV), $R^1$ is —$(OCH_2CH_2)_m$—$(OCH(CH_3)CH_2)_n$—$R^2$ In another embodiment of any of the surfactants of formulae (I)-(IV), $R^1$ is —$(OCH_2CH_2)_m$—$R^2$. In another embodiment of any of the surfactants of formulae (I)-(IV), $R^1$ is —$(OCH(CH_3)CH_2)_n$—$R^2$.

In an example of any of the preceding embodiments, q is 1. In another example of any of the preceding embodiments, q is 2. In an example of any of the preceding embodiments, q is 3. In another example of any of the preceding embodiments, q is a mixture of 1, 2, and 3, such as, about 68% q=3, about 28% q=2, and remainder q=1.

In an example of any of the preceding embodiments, $R^2$ is

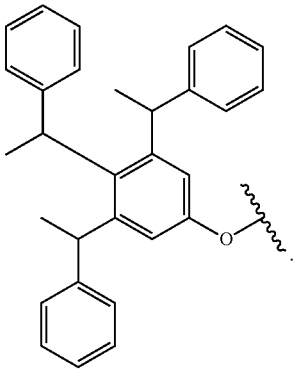 [SMILES: *Oc1cc(C(C)c2ccccc2)c(C(C)c2ccccc2)c(C(C)c2ccccc2)c1]

In an example of any of the preceding embodiments, n and m, when present, can be each independently from 1 to 50. For example, m, when present, is from 1 to 30, or is from 1 to 25, or is from 1 to 20, or is from 1 to 15, or is from 10 to 30, or is from 10 to 25, or is from 10 to 20. In another example of any of the preceding embodiments, n, when present, is from 1 to 20, or is from 1 to 10, or is from 1 to 5. When the variables "m" and "n" have non-integer values, the surfactant of formula (I), (II), (III), or (IV), represents a mixture of surfactants, each defined by the formula where the average value for "m" or "n" is the stated value. For example, where n=1.5, the surfactant is a mixture of compounds, each according to formula (I), that have an average n value of 1.5.

Particular examples of the surfactants described above include those defined by:
  a. R is —OH, G is —$SO_3Na$, $G^1$ is hydrogen, m is 16, n is 0, and q is a mixture of 1, 2, and 3;
  b. R is —OH, G is —$SO_3Na$, $G^1$ is hydrogen, m is 4, n is 0, and q is a mixture of 1, 2, and 3;
  c. R is —OH, G is —$SO_3Na$, $G^1$ is hydrogen, m is 16, n is 1.5, and q is a mixture of 1, 2, and 3;
  d. R is $R^1$, G is —$SO_3Na$, $G^1$ is hydrogen, m is 8, n is 0, and q is a mixture of 1, 2, and 3;
  e. R is —OH, G is —SO3Na, $G^1$ is hydrogen, m is 8, n is 0, and q is a mixture of 1, 2, and 3;
  f. R is —OH, G is —SO3Na, $G^1$ is hydrogen, m is 7, n is 8, and q is a mixture of 1, 2, and 3;
and salts thereof (e.g., sodium salts thereof).

In one particular embodiment, the surfactant according to any of the preceding is a salt. "Salt" as used herein means a compound formed between a cation and an anion of the surfactant of formula (I), (II), (III), or (IV). The anion of the surfactant of formulae (I), (II), (III), or (IV) can be a monoanion or a dianion. Suitable salts include, but are not limited to, organic salts (e.g., ammonium salts), Group (I) cationic salts (e.g., lithium, sodium, or potassium salts), and Group (II) cationic salts (e.g., magnesium or calcium salts). In one particular embodiment, the surfactant according to any of the preceding embodiments is a sodium salt (e.g., a monosodium or disodium salt). In another embodiment, the surfactant according to any of the preceding embodiments is an ammonium salt (e.g., a mono-ammonium or di-ammonium salt). In another embodiment, the surfactant according to any of the preceding embodiments is a tetra($C_{1-4}$ alkyl) ammonium salt (e.g., tetra(n-butyl)ammonium (e.g., a mono-tetra(n-butyl)ammonium or di-tetra(n-butyl)ammonium salt).

"Alkyl" as used herein means a monovalent, straight or branched, or cyclic saturated hydrocarbon chain having one to thirty carbon atoms unless defined otherwise (e.g., $C_{1-4}$ alkyl contains 1-4 carbon atoms). Representative examples of "alkyl" groups include methyl, ethyl, propyl, iso-propyl, n-butyl, iso-butyl, n-pentyl, neo-pentyl, n-hexyl, 2-ethylhexyl, cyclochexyl, n-octyl, n-decyl, and the like. Similarly, "alkoxy" as used herein means an alkyl group, as defined here, connected to a parent chemical moiety through an oxygen atom. Representative examples of "alkoxy" groups include methoxy, ethoxy, isopropoxy, octyloxy, decyloxy, dodecyloxy, and the like.

Generally, any ethylenically unsaturated monomer that is capable of undergoing radical-initiated polymerization may be utilized as the at least one radical polymerizable monomer to prepare an emulsion polymer latex according to the preceding description. Radical-polymerizable monomers that may be polymerized or co-polymerized in the presence of a radical initiator are known to the art and are described below in a representative manner. Examples of suitable radical-polymerizable monomers include (a) acrylic acid, methacrylic acid, itaconic acid, crotonic acid, maleic acid, fumaric acid, aconitic acid, citraconic acid, and esters and/or amides thereof, (b) vinyl and allyl monomers, (c) ethylene and $C_{4-8}$ conjugated dienes, and mixtures of (a)-(c).

Examples of radical-polymerizable monomers (a) include: acrylic esters and methacrylic esters such as $C_{1-12}$ (e.g., $C_{1-4}$) alkyl acrylates and methacrylates, such as methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, n-hexyl acrylate, 2-ethylhexyl acrylate, 2-ethylhexyl methacrylate, t-butyl acrylate, t-butyl methacrylate, 3,3-dimethylbutyl acrylate, 3,3-dimethyl butyl methacrylate, lauryl acrylate, lauryl methacrylate, decyl acrylate, and decyl methacrylate; hydroxyl- and amine-substituted acrylic esters and methacrylic esters such as 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl methacrylate, 4-hydroxybutyl methacrylate, N, N-diethylaminoethyl methacrylate, N,N-dimethylaminoethyl methacrylate, tert-butylaminoethyl methacrylate, dimethylaminoneopentyl methacrylate, dimethylaminopropyl methacrylate, N,N-diethylaminoethyl acrylate, N, N-dimethylaminoethyl acrylate, tert-butylaminoethyl acrylate, dimethylaminoneopentyl acrylate, and dimethylaminopropyl acrylate; phosphate-acrylic esters and methacrylic esters such as hydroxyethyl methacrylate phosphate, hydroxyethyl acrylate phosphate, hydroxypropyl methacrylate phosphate, and hydroxypropyl acrylate phosphate; dialkyl esters such as dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate, and dioctyl itaconate; amides such as acrylamide, 2-acrylamido-2-methyl-1-propanesulfonic acid, (3-acrylamidopropyl)trimethylammonium chloride, N-acryloylamido-ethoxyethanol, N-(3-aminopropyl) methacrylamide, N-tert-butylacrylamide, diacetone acrylamide, N,N-diethylacrylamide, N, N-diethylmethacrylamide, N, N-dimethylacrylamide, N-[3-(dimethylamino) propyl]methacrylamide, N-diphenylmethylacrylamide, N-ethylacrylamide, N, N'-hexamethylenebis(methacrylamide), N-hydroxyethyl acrylamide, N-(hydroxymethyl)acrylamide, N-(isobutoxymethyl)acrylamide, N-isopropylacrylamide, N-isopropylmethacrylamide, methacrylamide, N-(3-methoxypropyl)acrylamide, N-phenylacrylamide, N-(triphenylmethyl)methacrylamide, and N-[tris(hydroxymethyl)methyl]acrylamide.

Examples of radical-polymerizable monomers (b) include: vinyl and vinylidene halides such as vinyl chloride, vinylidene chloride, vinyl fluoride, and vinylidene fluoride; vinyl nitriles such as acrylonitrile, α-chloroacrylonitrile and methacrylonitrile; vinyl esters (e.g., vinyl esters of $C_{1-6}$ saturated monocarboxylic acids), such as vinyl formate, vinyl acetate, vinyl propionate, vinyl butyrate, vinyl isobutyrate, vinyl valerate, and vinyl caproate, and vinyl esters of branched tertiary monocarboxylic acids (e.g.,)$CH_2$=CH—OC(O)C($R^O$)$_3$ or $CH_2$=CH—OC(O)C($CH_3$)($R^O$)$_2$, where each $R^O$ is independently a straight-chain-$C_{1-10}$ alkyl group or branched-chain $C_{3-10}$ alkyl group, such as VEOVA® 9 or 10, Momentive Specialty Chem., Gahanna, Ohio; and $CH_2$=CH—OC(O)($CH_2$)$_p$C($CH_3$)$_3$, where p is 0, 1, 2, 3, 4, 5, 6, 7, 8, 9, or 10, such as EXXAR® Neo Vinyl Esters by ExxonMobil Chemical Company); vinyl ethers such as methylvinyl ether, ethylvinyl ether and n-butylvinyl ether. Typically vinyl ketones include methylvinyl ketone, ethylvinyl ketone and isobutylvinyl ketone; vinyl amines and amides such as N-vinylpyrrolidone (NVP), N-acetyl vinylamine, and N-vinylcarbazole (NVC); styrene-derivatives such as styrene, α-methyl styrene, vinyl toluene, 4-(tert-butyl)styrene, 4-chloromethylstyrene, 4-methylstyrene, 4-nitrostyrene, 4-tert-butoxystyrene, 4-vinylbenzoic acid, and chloromethylstyrene; and allyl derivatives of the preceding.

Examples of radical-polymerizable monomers (c) include ethylene, and $C_{4-8}$ conjugated dienes, such as 1,3-butadiene, isoprene and chloroprene.

In one embodiment, the at least one radical-polymerizable monomer comprises acrylic acid, methacrylic acid, or a mixture thereof (e.g., greater than 0 and less than or equal to about 2 wt. % based on all monomers) and one or more additional monomers selected from the group consisting of vinyl monomers (e.g., styrene), acrylate monomers (e.g $C_{1-4}$ alkyl acrylates), methacrylate monomers (e.g., $C_{1-4}$ alkyl methacrylates), and mixtures thereof.

In another embodiment, the at least one radical-polymerizable monomer comprises methacrylic acid (e.g., greater than 0 and less than or equal to about 2 wt. % based on all monomers), methyl methacrylate, and n-butyl acrylate.

In another embodiment, the at least one radical-polymerizable monomer comprises acrylic acid (e.g., greater than 0 and less than or equal to about 2 wt. % based on all monomers), methyl acrylate, and n-butyl acrylate.

In another embodiment, the at least one radical-polymerizable monomer comprises acrylic acid (e.g., greater than 0 and less than or equal to about 2 wt. % based on all monomers), and methyl methacrylate, hydroxyethyl methacrylate phosphate, hydroxyethyl acrylate phosphate, hydroxypropyl methacrylate phosphate, hydroxypropyl acrylate phosphate, or a mixture thereof.

The monomer emulsion may contain additional, optional components that are compatible with the radical polymerization process. Examples of suitable additional components include chain-transfer agents and buffers. Examples of chain-transfer agents include thiocarbonylthio compounds such as dithioesters, dithiocarbamates, trithiocarbonates, and xanthate, such as 2-cyano-2-propyl benzodithioate, 4-cyano-4-[(dodecylsulfanylthiocarbonyl) sulfanyl]pentanoic acid, cyanomethyl methyl(phenyl) carbamodithioate, 4-cyano-4-(phenylcarbonothioylthio) pentanoic acid, 2-cyano-2-propyl dodecyl trithiocarbonate, 2-(dodecylthiocarbonothioylthio)-2-methylpropionic acid, and cyanomethyl dodecyl trithiocarbonate.

The surfactant as described above can be used in the monomer emulsion at about 0.1 wt % to about 5 wt % based on weight of all monomers to be polymerized with a conventional free radical emulsion polymer system to produce latexes with good polymerization kinetics, particle size distributions as well as low coagulum levels. In certain embodiments, the monomer emulsion comprises about 0.1 wt % to 3 wt %, about 1 wt % to 3 wt %, or about 0.1 wt % to 2 wt %, or about 1 wt % to 2 wt % of the surfactant.

In certain embodiments, the surfactant described above can provide, after polymerization, an emulsion polymer latex comprising polymer particles having a mean diameter of between about 50 nm and about 300 nm. For example, the polymeric latex particles can have a mean diameter of less than about 200 nm, or less than about 175 nm, or less than about 150 nm. In other examples, the polymeric latex particles have a mean diameter of greater than about 75 nm, or greater than about 100 nm.

By the nature of the surfactants of formula (I), polymer latexes having a mean polymeric latex particle diameter of between about 50 nm and about 300 nm can be prepared using less surfactant on a molar basis with respect to standard surfactants, such as sodium dodecylbenzene sulfonate (SDS). This result is in direct contrast with the expectation of one skilled in the art. Generally, it would be expected that a higher molar amount of a surfactant would be required to decrease the average particle size of a resulting latex.

Put another way, by using the same wt % of a surfactant of formula (I), a latex can be prepared that has a smaller average particle diameter than a latex prepared under the same conditions, but using a standard surfactant, such as SDS. In this case, as the surfactants of formula (I) generally have a higher molecular weight than standard surfactants, the same wt % of the surfactant of formula (I) represents a lower molar amount of surfactant than if the same wt % of a standard surfactant were used.

In general, the polymerization processes to prepare the emulsion polymer latex can be carried out at from about 20° C. to about 120° C.; alternatively, between about 50° C. and about 110° C. The polymerization temperature selected will vary, depending on the reactivity and concentration of the polymerization initiator and monomer(s) being used. Batch polymerization times may vary depending on the method of polymerization and the monomer(s) being polymerized. Such times may vary from about 10 minutes to about 10 hours.

Suitable initiators include those known to one skilled in the art for preparing emulsion polymers, such as peroxides including conventional benzoyl peroxide (BPO), azodiisobutyronitrile (AIBN), 4,4'-azobis(4-cyanovaleric acid) (ACVA), sodium persulfate, ammonium persulfate, potassium persulfate, and hydrogen peroxide. The amount of initiator can be from about 0.1 to about 8 percent by weight of the entire monomer emulsion. For example, in certain embodiments, the amount of initiator can be from about 2 to about 6 percent by weight of the entire monomer emulsion.

Polymer latexes having an average particle size of less than 200 nm (or less than 175 nm or less than 150 nm or less than 125 nm or less than 110 nm) and greater than about 50 nm (or greater than about 75 nm) prepared using a surfactant of formula (I), (II), (III), or (IV) advantageously, as prepared, contain essentially no coagulate. That is, if the as prepared latex is filtered through a 100 mesh filter, then essentially no solids are retained on the filter (e.g., less than about 0.05 wt % of the solids, or less than about 0.03 wt % of the solids, or less than about 0.01 wt % of the solids).

In one particular embodiment, a polymer latex having an average particle size of less than 125 nm and greater than about 75 nm, for example, about 100 nm, can be prepared using a surfactant of formula (I), (II), (III), or (IV) that contains essentially no coalgulate.

Further, the latexes prepared using a surfactant of formula (I), (II), (III), or (IV) show increased water resistance with respect to latexes prepared using SDS as a surfactant. Alternatively, the latexes prepared using a surfactant of formula (I), (II), (III), or (IV) show increased water resistance with respect to latexes prepared using TSP-16 sulfate as a surfactant. TSP-16 sulfate is a surfactant of the formula,

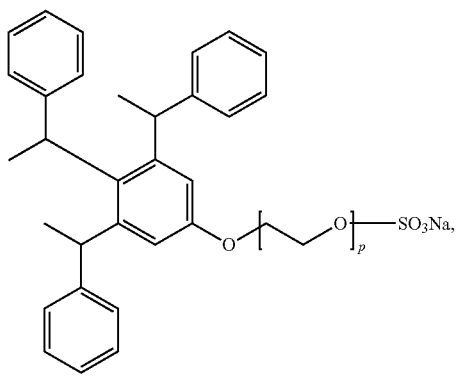

where p is, on average, about 16.

In one embodiment, the latex prepared using a surfactant of formula (I), (II), (III), or (IV) show a lower opacity as measured according to the method described in Example 16 with respect to a latex prepared under the same conditions, but substituting a standard surfactant, such as SDS or TSP-16 sulfate. In another embodiment, the latexes prepared using a surfactant of formula (I), (II), (III), or (IV) have a delta L* value of less than 10, or less than 9 or less than 8 or less than 7 or less than 6 or less than 5 or less than 4, as measured according to the method described in Example 16. In another embodiment, the latexes prepared using a surfactant of formula (I), (II), (III), or (IV) have a delta L* value of between about 4 and 10, or between 4 and 8, or between 4 and 6, as measured according to the method described in Example 16. In another embodiment, the latexes prepared using a surfactant of formula (I), (II), (III), or (IV) have an opacity of less than 5, or less than 2, or less than 1 as measured according to the method described in Example 27. In another embodiment, the latexes prepared using a surfactant of formula (I), (II), (III), or (IV) have an opacity of between 0 and 5, or between 0 and 2, or between 0 and 1, as measured according to the method described in Example 27.

Applications

The preceding emulsion polymer latexes can be, for example, acrylic, styrene-acrylic, and vinyl-acrylic latexes that are prepared to have a glass-transition temperature suitable for a desired application. For example, higher glass transition temperature emulsion polymer latexes can be used in coating and paint applications and can improve or modify, for example, block resistance, adhesion, gloss, pigment dispersion, and blister resistance in paints, as well as water resistance in paints and coatings. Lower glass transition temperature emulsion polymer latexes can be used in adhesive type applications and can improve or modify, for example adhesion and water resistance.

The emulsion polymer latex compositions can include a variety of additional components, depending on the intended use of the composition. For example, the composition may also comprise one or more pigments, secondary surfactants, coalescing agents, thickening agents, biocides, and combinations thereof when utilized for a latex paint composition. Examples of suitable pigments include titanium dioxide (TI-PURE® R-746, E.I. du Pont de Nemours and Company, Wilmington, Del.), calcium carbonate, aluminum silicate, magnesium silicate, carbon black and iron oxide. Examples of suitable coalescing agents or solvents include, but are not limited to, TEXANOL™ (an ester alcohol commercially available from Eastman Chemical Company, Kingsport, Tenn.), and glycol ethers, such as propylene glycol. Examples of suitable thickening agents include ACRYSOL™ SCT-275 (an associative type thickener commercially available from Rohm and Haas Company (Philadelphia, Pa.)), cellulosic thickeners such as hydroxylated cellulose and alkali soluble-type thickeners. Examples of suitable biocides include ACTICIDE® MBS biocide (a 1:1 (by wt.) of 1,2-benzisothiazolin-3-one and 2-methyl-4-isothiazolin-3-one, Thor Specialties, Inc., Shelton, Conn.). Examples of suitable secondary surfactants, for example, surfactants added to the final latex composition, but not used in preparing the latex, include MAKON® TD-9 (Stepan Co., Northfield, Ill.). Examples also include AEROSOL OT-75, which is not required to prepare the pressure sensitive adhesive latex, but can be used as a post-additive to enhance wetting.

The glass transition temperatures ($T_g$) of emulsion polymer latexes used to formulate latex paints, while depending on the particular application, can be about −20° C. to about 80° C., alternatively greater than about 5° C.; for example, the $T_g$ can be between about 15° C. and about 80° C. In some embodiments, if the $T_g$ of the paint coating is below about 15° C., blocking can occur. On the other hand, if the $T_g$ is above about 80° C., the coating may be too brittle and susceptible to cracking. $T_g$ may be measured using differential scanning calorimetry (DSC) according to methods familiar to those skilled in the art.

In certain embodiments, the latex paints prepared using a latex that was prepared with surfactant of formula (I), (II), (III), or (IV) show good leveling characteristics as measured according to Example 15. In certain other embodiments, the latex paints prepared using a latex that was prepared with surfactant of formula (I), (II), (III), or (IV) show blister resistance as measured according to Example 15. In other embodiments, the latex paints prepared using a latex that was prepared with surfactant of formula (I), (II), (III), or (IV) show good leveling characteristics and blister resistance, each as measured according to Example 15.

Alternatively, the expected $T_g$ of a polymer can also be based on its composition. Thus, coating applications and/or compositions containing polymers that can exhibit a $T_g$ between about 5° C. and about 80° C. exhibit minimum film-forming temperature (MFFT) (based upon the latex polymer, pigment, coalescing aides, etc.) of about 4° C. or greater. The MFFT is related to the $T_g$ of the polymer, but is also affected by the other components of the formulation (e.g., coalescing aides, pigments, etc.). Thus, the $T_g$ or MFFT of the present technology can be evaluated depending upon the polymer latexes or the paints or other coating compositions of the present technology.

In another example, the emulsion polymer latexes described above can be used in applications that are affected by surfactant migration, for example, in the area of clear pressure-sensitive adhesives. Pressure-sensitive adhesive systems are adhesives that are aggressively and permanently tacky at room temperature in the dry form. There is no curing agent required in such systems, and they adhere without the need of more than finger or hand pressure. Further, pressure-sensitive adhesive systems require no activation by water, solvent, or heat.

The glass transition temperatures ($T_g$) of pressure sensitive adhesives with which the present technology is typically used depend somewhat on the particular application, but are generally about 30 to about 70° C. below the intended use temperature, or less than about (−)15° C. and preferably between about (−)60° C. and about (−)40° C. The $T_g$ of individual components of pressure sensitive adhesives can range between about (−)90° C. to about 365° C. It will be appreciated by those skilled in the art that the $T_g$ of the polymer latexes of the present technology will vary depending upon the end use or end application desired.

The preceding embodiments are illustrated by the following examples, which are not to be construed as limiting the invention or scope of the specific procedures or compositions described herein. One skilled in the art will recognize that modifications may be made in the presently described technology without deviating from the spirit or scope of the invention. All levels and ranges, temperatures, results, etc., used and/or described herein are approximations unless otherwise specified.

EXAMPLES

Tristyrylphenol poly(ethylene oxide)- and tristyrylphenol poly(propylene oxide-block-ethylene oxide)-sulfosuccinates were synthesized. Various TSP alkoxylate sulfosuccinate derivatives were then evaluated as primary emulsion polymer surfactants to produce stable latexes with good particle size distributions and fast polymerization kinetics. The resulting latexes were formulated into latex paint formulations which exhibited good alkaline stability, and good overall paint properties with improvement in blister resistance, wet film leveling, and dry paint film water resistance as compared to a latex made with a conventional anionic surfactant (e.g. POLYSTEP® A-15, infra). Additionally, PSA type latexes were created using the aforementioned surfactants which exhibited improvements in latex film water resistance as compared to a latex made with a conventional anionic surfactant (e.g. POLYSTEP TSP-16S).

Example 1

Synthesis of TSP-16 EO Sulfosuccinate Half-Ester 355 g (0.37 mol) of tristyrylphenol (TSP) 16 mole ethoxylate (POLYSTEP® TSP-16, Stepan Co., Northfield, Ill.) having an equivalent weight of 960 g/mol based on a hydroxyl value of 58.4 mg KOH/g was charged to a 0.5 L four neck round bottom flask. The flask was equipped with an agitator, thermo-couple and heating mantel. The reactor was heated to 55° C. 36 g of maleic anhydride was added (0.37 mol) was added, it quickly dissolved. The reactor was heated to 85° C. under mild agitation. The progress of converting the anhydride to monoester was monitored by FTIR as the peak at 1776 cm$^{-1}$ corresponding to the starting anhydride was converted to the monoester at 1729 cm$^{-1}$. Complete conversion to the maleate half-ester took about 200 minutes.

134 g (0.13 mol) of the TSP-16 maleate half-ester having an equivalent weight of about 1058 g/mol was charged to 0.5 L round bottom flask along with 22 g of water. The flask was equipped with an agitator, thermo-couple and heating mantel. 10.5 g of 50 wt % sodium hydroxide was added to pH 7.5 with a mild exotherm to 55° C. 13.2 g of sodium bisulfite (0.13 mol) dissolved in 36 g of water over several minutes. Reaction became viscous immediately with addition of bisulfate. Reaction was heated to about 75° C. After 35 minutes, proton NMR indicated the double bond had reacted as indicated by the disappearance of the resonance signals at around 6.5 ppm. Additional water was added to reaction with vigorous agitation. The final product was a light yellow and clear solution. Oven solids and pH were 25.8% and 5.3, respectively.

Example 2

Synthesis of TSP-1.5/16 PO/EO Sulfosuccinate Half-Ester 395 g (0.35 mol) of TSP alkoxylate (having an average of 1.5 mol propylene oxide (PO)+16 mol ethylene oxide (EO) per mol TSP) having an equivalent weight of 1126 g/mol based on a hydroxyl value of 49.8 mg KOH/g was charged to a 0.5 L four neck round bottom flask. The flask was equipped with an agitator, thermo-couple and heating mantel. The reactor was heated to 60° C. followed by the addition of 34.4 g maleic anhydride (0.35 mol) which dissolved quickly. Heated reaction to 90° C. and was maintained for 120 minutes. Analysis by FTIR indicated disappearance of the peak at 1776 cm$^{-1}$ corresponding to the starting anhydride.

149 g (0.12 mol) of the TSP alkoxylate half-ester having an equivalent weigh of about 1224 g/mol was charged to 1 L round bottom flask and warmed to 45° C. 48 g of water and 1.5 g sodium bicarbonate were added followed by adjustment to pH 7.3 with small amount of 50% sodium hydroxide. 25 g of ethanol was added to reduce viscosity. To the 50° C. reaction was added 12.7 g (0.12 mol) sodium bisulfate dissolved in 42 g water. Reaction developed higher viscosity, added 10 g ethanol. After a couple of hours at 55° C. proton NMR indicated the double bond had reacted as indicated by the disappearance of the resonance signals at around 6.5 ppm. 300 g of water was added under vigorous agitation, adjusted pH from 5.6 to 6.9 with 50% sodium hydroxide. The reactor was fitted with a Dean-Stark tube and condenser and heated to 70° C. while pulling a vacuum of 450 mm Hg to remove ethanol as collected in Dean-Stark. An additional amount of water was added. The sulfosuccinate was then transferred to a bottle. The final product was clear light yellow with oven solids of 25.5%.

Example 3

Synthesis of TSP-4 EO Sulfosuccinate Half-Ester 152.9 g (0.28 mol) of TSP alkoxylate (4 mole ethoxylate) having an equivalent weight of 546 g/mol based on a hydroxyl value of 102.7 mg KOH/gram was charged to a 1 L four neck round bottom flask. The flask was equipped with an agitator, thermo-couple and heating mantel. The reactor was heated to 135° C. and sparged with nitrogen to remove residual moisture for one hour, followed by cooling to 95° C. and the addition of 27.4 g maleic anhydride (0.28 mol) which dissolved quickly. Heated reaction to 90° C. and was maintained for 120 minutes. Analysis by FTIR indicated disappearance of the peak at 1776 cm$^{-1}$ corresponding to the starting anhydride. The reactor was cooled to 58° C. and 2.4 g sodium bicarbonate followed by 28 g water and 16 g ethanol, pH was adjusted from 4.0 to 6.8 with 21.2 g 50% sodium hydroxide along with an additional 50 g water and 41 g ethanol to reduce viscosity. Slowly added 29.2 g sodium bisulfate (0.265 0.27 mole) dissolved in water with occasional addition of ethanol to lower viscosity. The reaction was maintained at 55° C. for 90 minutes at which time proton NMR indicated complete conversion to the sulfonate. The pH was adjusted from 6.1 to 7.0 with 2.5 g 50% sodium hydroxide. A total of about 200 g water and 80 g ethanol had been added to the reaction. The reactor was fitted with a Dean-Stark tube and condenser and heated to 70° C. while pulling a vacuum of about 250 mm Hg to remove ethanol as collected in Dean-Stark. Water was periodically added to the reactor to replenish that lost in the ethanol removal process. After about two hours, the reaction content was transferred to a jar; it formed a white paste as it cooled with oven solids of 35.3% and pH of 7.0

Example 4

Synthesis of TSP-8 EO Sulfosuccinate Diester 399 g (0.55 mol) of TSP alkoxylate (8 mole ethoxylate) having an equivalent weight of 725 g/mol based on a hydroxyl value of 77.4 mg KOH/g was charged to a 1 L four neck round bottom flask. The flask was equipped with an agitator, thermo-couple and heating mantel, water cooled condenser and Dean-Stark tube. The reactor was heated to 135° C. and sparged with nitrogen to remove residual moisture for one hour. To the reactor were added 1.7 g butylated hydroxyl toluene (BHT), 39.6 g dimethyl maleate (0.275 mol) and 2.1 g FASCAT® 4201 trans-esterification catalyst (dibutyltin oxide, Arkema Inc., Philadelphia, Pa.). The reactor temperature set point was increased to 170° C. and continuous stream of nitrogen was applied to the reactor to facilitate the removal of methanol from the reaction. After 2 hours methanol was collected in the Dean-Stark tube (18.5 g off, theoretical 17.6 g). It was determined by proton NMR the dimethyl maleate methyl groups were removed by the transesterification process and replaced with two moles of TSP-8 ethoxylate to form the maleate tristyrylphenol ethoxylate diester. 150.3 g (0.1 mol) of the TSP-8 maleate diester was charged to a 1 L four neck round bottom flask equipped with an agitator, thermo-couple and heating mantel, water cooled condenser. The reactor was heated to 60° C. followed by the addition of about 175 g methanol and 25 g of water. 10.2 g of sodium bisulfate (0.1 mol) dissolved in 13 g water and 26 g methanol was added. The reaction was heated to reflux of 67° C. for an hour followed by the attachment of a Dean-Stark tube for the removal of methanol over a period of about 30 minutes. Once the methanol was removed, the reaction was cooled resulting in the recovery of 199 g of TSP-8 sulfosuccinate diester with calculated solids of 80%. The final product was a fluid amber hazy liquid.

Example 5

Synthesis of TSP-8 EO Sulfosuccinate Half-Ester 363 g (0.50 mol) of TSP alkoxylate (8 mole ethoxylate) having an equivalent weight of 724 g/mol based on a hydroxyl value of 77.4 mg KOH/gram was charged to a 0.5 L four neck round bottom flask. The flask was equipped with an agitator, thermo-couple and heating mantel. The reactor was heated to 135° C. and sparged with nitrogen to remove residual moisture for one hour, followed by cooling to 85° C. and the addition of 48.9 g maleic anhydride (0.50 mol) which dissolved quickly. Heated reaction to 95° C. and was maintained for 120 minutes. Analysis by FTIR indicated disappearance of the peak at 1776 cm$^{-1}$ corresponding to the starting anhydride. The reactor was cooled to 62° C., 60 g water followed by 37.7 g 50% NaOH added to pH 6.5. 51.9 g sodium bisulfite (0.50 mol) dissolved in 145 g water slowly added. The reaction mixture quickly thickened as sodium bisulfite was added, 110 g ethanol added to reduce viscosity during bisulfite addition, pH was adjusted from 4.0 to 6.8 with 21.2 g 50% NaOH along with an additional 50 g water and 41 g ethanol to reduce viscosity. Slowly added 29.2 g sodium bisulfite (0.27 mol) dissolved in water with occasional addition of ethanol to lower viscosity. The reaction produced a mild exotherm to 60° C. After 30 minutes, proton NMR indicated maleate completely converted to the sulfonate. The reactor was fitted with a Dean-Stark tube and condenser, heated to 70° C. while pulling a vacuum of about 250 mm Hg to remove ethanol collected in the Dean-Stark tube. Water was periodically added to the reactor to replenish that lost in the ethanol removal process. After about two hours, the reaction contents transferred to a jar. Final oven solids of 35.3% and pH of 6.7.

Example 6

Synthesis of TSP-8 PO/7EO Sulfosuccinate Half-Ester 116.4 g (0.12 mol) of TSP alkoxylate (8 mole propoxylate/7 mole ethoxylate) having an equivalent weight of 1013 g/mol based on a hydroxyl value of 55.4 mg KOH/gram was charged to a 1 L four neck round bottom flask. The flask was equipped with an agitator, thermo-couple and heating mantel. The reactor was heated to 115° C., 11.5 g maleic anhydride (0.12 mol) added which dissolved quickly. Reactor 95° C. was maintained at 115° C. for 120 minutes. Analysis by FTIR indicated disappearance of the peak at 1776 cm$^{-1}$ corresponding to the starting anhydride. The reactor was cooled to 60° C., 32 g water and 14 g ethanol added followed by the addition of 7.3 g 50% NaOH to pH 4.5. 12.2 g sodium bisulfate (0.12 mol) dissolved in 40 g water slowly added. The reaction mixture thickened as sodium bisulfite was added, 7 g additional ethanol and 90 g water were. pH was adjusted to 5.7 with 3.3 g 50% NaOH along with an additional 50 g water and 41 g ethanol to reduce viscosity. The reactor was fitted with a Dean-Stark tube and condenser, heated to 70° C. while pulling a vacuum of about 250 mm Hg to remove ethanol collected in the Dean-Stark tube. Water was periodically added to the reactor to replenish that lost in the ethanol removal process. Transferred viscous material to a jar. Final oven solids of 44.4% and pH of 5.9.

Example 7

Latex Synthesis Using Surfactant (3.0%) from Example 1

To a 2-L 4-neck round bottom flask equipped with a Teflon agitator blade, nitrogen surface sparge tube, heating mantel and thermocouple connected to a Therm-O-Watch® temperature controller were added 225 g deionized (DI) water. The reaction vessel was heated to 83° C. and an in-situ latex seed was prepared by the addition of 13 g of monomer emulsion (ME) followed by a solution consisting of 1.0 g ammonium persulfate, 0.5 g sodium bicarbonate dissolved in 20 g DI water. The ME was prepared by adding 58.0 g of the sulfosuccinate half-ester as described in example 1 in 107 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator an exotherm to 85° C. was observed indicating polymerization of the monomers. Dynamic light scattering indicated the in-situ seed average particle size distribution to be 43 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. The resulting latex was pH adjusted from 5.4 to 7.5 with 6.6 g of dilute ammonium hydroxide followed by the addition of 0.6 g ACTICIDE® MBS biocide (1:1 (by wt.) of 1,2-benzisothiazolin-3-one and 2-methyl-4-isothiazolin-3-one, Thor Specialties, Inc., Shelton, Conn.). The latex was filtered through a 100 mesh screen, 0.06 g of coagulum was collected on the screen. The reactor was clean-free of coagulum build-up. The final average latex particle size was 175 nm.

Example 8

Latex Synthesis Using Surfactant (3.0%) from Example 2

The same general procedure described in Example 7 was followed. The ME was prepared by adding 58.8 g of the sulfosuccinate half-ester as described in example 2 in 107 g DI water to which was added with vigorous agitation the monomer composition described in Example 5. 14.8 g of the ME was added to the 83° C. reaction vessel and allowed to polymerize to form an in-situ seed of 49 nm. After three hour addition of ME and initiator feeds followed by an one hour cook followed by cooling the resulting latex was pH adjusted from 5.4 to 7.5 with 6.4 g dilute ammonium hydroxide followed by the addition of 0.6 g ACTICIDE® MBS biocide. The latex was filtered through a 100 mesh screen, 0.03 g of coagulum was collected on the screen. The reactor was clean—free of coagulum build-up. The final average latex particle size was 189 nm.

Example 9

Latex Synthesis Using Surfactant (3.0%) from Example 3

The same general procedure described in Example 7 except 4.0 g sulfosuccinate half-ester as described in example 3 was added to the reaction vessel along with 225 g of DI water. The ME was prepared by dissolving 17.2 g of the sulfosuccinate half-ester as described in example 3 in 139 g DI water to which was added with vigorous agitation the monomer composition described in Example 5. 33.0 g of the ME was added to the 83° C. reaction vessel and allowed to polymerize to form an in-situ seed of 49 nm. After three hour addition of ME and initiator feeds followed by an one hour cook followed by cooling the resulting latex was pH adjusted from 5.3 to 7.0 with 11.2 g dilute ammonium hydroxide followed by the addition of 0.6 g ACTICIDE® MBS biocide. The latex was filtered through a 100 mesh screen, 0.01 g of coagulum was collected on the screen. The reactor was clean—free of coagulum build-up. The final average latex particle size was 120 nm.

Example 10

Control Latex Synthesis Using Sodium Dodecylbenzene Sulfonate Conventional Surfactant The same general procedure described in Example 7 was followed. The ME was prepared by adding 19.7 g of POLYSTEP® A-15 (Stepan Co., Northfield, Ill.), which is a sodium salt of linear dodecylbenzene sulfonate at 22.8% solids to 135 g DI water to which was added with vigorous agitation the monomer composition described in Example 5. 13.0 g of the ME was added to the 83° C. reaction vessel and allowed to polymerize to form an in-situ seed. After three hour addition of ME and initiator feeds followed by an one hour cook followed by cooling the resulting latex was pH adjusted from 5.3 to 7.2 with 5.0 g dilute ammonium hydroxide followed by the addition of 0.6 g ACTICIDE® MBS biocide. The latex was filtered through a 100 mesh screen, 0.03 g of coagulum was collected on the screen. The reactor was clean-free of coagulum build-up. The final average latex particle size was 188 nm.

Example 11

Small Particle Size Latex Synthesis Using Surfactant (3.0%) from Example 1

To a 2-L 4-neck round bottom flask equipped with a Teflon agitator blade, nitrogen surface sparge tube, heating mantel and thermocouple connected to a Therm-O-Watch® temperature controller were added 295 g deionized (DI) water and 5.8 g of the sulfosuccinate half-ester as described in example 1. The reaction vessel was heated to 83° C. and an in-situ latex seed was prepared by the addition of 43 g of monomer emulsion (ME) followed by a solution consisting of 1.0 g ammonium persulfate, 0.5 g sodium bicarbonate dissolved in 20 g DI water. The ME was prepared by adding 52.3 g of the sulfosuccinate half-ester as described in example 1 in 107 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator an exotherm to 85° C. was observed indicating polymerization of the monomers. Dynamic light scattering indicated the in-situ seed average particle size distribution to be 48 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. 0.6 g ACTICIDE® MBS biocide was added. The latex was filtered through a 100 mesh screen, essentially coagulum free. The reactor was clean—free of coagulum build-up. The final average latex particle size was 115 nm.

Example 12

Latex Synthesis Using Reduced Loading of Surfactant (1.5%) from Example 1

To a 2-L 4-neck round bottom flask equipped with a Teflon agitator blade, nitrogen surface sparge tube, heating mantel and thermocouple connected to a Therm-O-Watch® temperature controller were added 225 g deionized (DI). The reaction vessel was heated to 83° C. and an in situ latex seed was prepared by the addition of 17.5 g of monomer emulsion (ME) followed by a solution consisting of 1.0 g ammonium persulfate, 0.5 g sodium bicarbonate dissolved in 20 g DI water. The ME was prepared by adding 29.1 g of the sulfosuccinate half-ester as described in example 1 in 128 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator an exotherm to 85° C. was observed indicating polymerization of the monomers. Dynamic light scattering indicated the in-situ seed average particle size distribution to be 56 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. 0.6 g ACTICIDE® MBS biocide was added. The latex was filtered through a 100 mesh screen, essentially coagulum free. The reactor was clean—free of coagulum build-up. The final average latex particle size was 204 nm.

Example 13

Control Small Particle Size Latex Synthesis Using Tristyrylphenol-16 Sulfate Surfactant (3.0%)

To a 2-L 4-neck round bottom flask equipped with a Teflon agitator blade, nitrogen surface sparge tube, heating mantel and thermocouple connected to a Therm-O-Watch® temperature controller were added 295 g deionized (DI) water and 6.7 g of tristyrylphenol 16 mole ethoxylate sulfate (POLYSTEP® TSP-16S, Stepan Co., Northfield, Ill.) at 27.3% solids. The reaction vessel was heated to 83° C. and an in-situ latex seed was prepared by the addition of 43 g of monomer emulsion (ME) followed by a solution consisting of 1.0 g ammonium persulfate, 0.5 g sodium bicarbonate dissolved in 20 g DI water. The ME was prepared by adding 48.3 g of POLYSTEP® TSP-16S in 115 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator an exotherm to 85° C. was observed indicating polymerization of the monomers. Dynamic light scattering indicated the in-situ seed average particle size distribution to be 46 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. 0.6 g ACTICIDE® MBS biocide was added. The latex was filtered through a 100 mesh screen the presence of large quantities of coagulum made filtration difficult. The reactor and agitator blades contained significant build-up. The final average latex particle size was 115 nm.

Example 14

Control Latex Synthesis Using Reduced Loading of Tristyrylphenol-16 Sulfate Surfactant (1.5%)

To a 2-L 4-neck round bottom flask equipped with a Teflon agitator blade, nitrogen surface sparge tube, heating mantel and thermocouple connected to a Therm-O-Watch® temperature controller were added 225 g deionized (DI) water and 6.7 g of tristyrylphenol 16 mole ethoxylate sulfate (POLYSTEP® TSP-16S) at 27.3% solids. The reaction vessel was heated to 83° C. and an in-situ latex seed was prepared by the addition of 17.5 g of monomer emulsion (ME) followed by a solution consisting of 1.0 g ammonium persulfate, 0.5 g sodium bicarbonate dissolved in 20 g DI water. The ME was prepared by adding 48.3 g of tristyrylphenol 16 mole ethoxylate sulfate (POLYSTEP® TSP-16S) at 27.3% solids in 115 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator an exotherm to 85° C. was observed indicating polymerization of the monomers. Dynamic light scattering indicated the in-situ seed average particle size distribution to be 72 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. 0.6 g ACTICIDE® MBS biocide was added. The latex was filtered through a 100 mesh screen, collected 0.15 g coagulum. The final average latex particle size was 250 nm.

Example 15

Evaluations of Latex Paint Formulation Latex

Latex paints were formulated using pre-dispersed titanium dioxide (TiO$_2$) from DuPont (Wilmington, Del.), TI-PURE® R-746 at 76.62% solids. While mixing from an overhead mixer, DI Water, Propylene Glycol, followed by the addition of MAKON® TD-9 was added to the pigment. After mixing for about 15 minutes, the sample was poured off into smaller jars in equal amounts. Each aliquot received a latex described above while being stirred by an overhead mixer. The samples were then preserved with ACTICIDE® MBS. The thickener ACROYSOL™ SCT-275 (a nonionic urethane rheology modifier for latex paints, Dow Chemical, Midland, Mich.) was then slowly added to the paint to increase viscosity. The paints were left to mix for 10 minutes followed by the addition of ammonium hydroxide to increase the pH to 8.5. The coalescing solvent TEXANOL™ ester alcohol (2,2,4-trimethyl-1,3-pentanediol monoisobutyrate, Eastman Chemical, Kingsport, Tenn.) was then added to each of the paint formulations. Additional amounts of ACROYSOL™ SCT-275 was added to each paint as required to incrementally increase paint viscosity until the desired viscosity was reached, about 93 KU. The viscosity was allowed to stabilize overnight.

The resulting paint formulation yielded 48% solids.

Leveling

Leveling was determined using method ASTM D4062. The paint coatings were drawn down by hand on Black and White Leveling Charts using a leveling blade. The samples were dried for 24 hours at room temperature. The drawn down samples were compared to standards to determine the leveling characteristics. The draw downs produced smooth films free of fisheyes. The results are visually ranked, 9: Good leveling characteristic, 1: Poor leveling characteristic. See Table 1 below.

Blister Resistance

Blister resistance samples were drawn down using a small minimum form forming temperature bar (MFFT) bar on aged alkyd panels. The panels were left to dry at room temperature for 14 days. Samples were cut into 1.5"×1.5" squares and placed into 4 oz jars of 90° C. DI Water and stored for 7 days. The samples were removed and photographed to compare blister results. The results are visual as described. See Table 1.

TABLE 1

| Latex | Surfactant | Leveling | Blistering? |
|---|---|---|---|
| Example 7 | Example 1 | 9 | No |
| Example 8 | Example 2 | 9 | No |
| Example 9 | Example 3 | 9 | No |
| Example 10 | Control | 6 | Yes |

Example 16

Water Sensitivity Test of Latex Films

Finished latexes were drawn down using a 20 micron wet film applicator onto vinyl chloride/acetate copolymer black scrub test panels (Gardco Form P121-10N plastic panels). The wet films were stored in a 75° C. oven for 30 minutes to dry. The dried films were removed from the oven, cut into 1.5 in.×1.5 in. squares, and the initial opacity on the samples (black) was determined. The films were stored in 4 oz. jars containing 25° C. water and stored 2 hours. After 2 hours the samples were removed from the jars and quickly patted down with KIMWIPES® to remove excess water. The whitened samples from exposure to water were then measured using a Minolta CM-2600d/2500d handheld spectrophotometer. The delta L* values (before and after water exposure) are listed in Table 2. Higher L* values indicate more whitening (increased opacity) and therefore greater water sensitivity.

TABLE 2

| Latex | Surfactant | Delta L* |
|---|---|---|
| Example 14 | TSP-16S | 12.7 |
| Example 12 | Example 1 | 4.0 |

Example 17

Latex Synthesis Using Surfactant (3.0%) from Example 4

To a 2-L 4-neck round bottom flask equipped with a Teflon agitator blade, nitrogen surface sparge tube, heating mantel and thermocouple connected to a Therm-O-Watch® temperature controller were added 300 g deionized (DI) water and 3.5 g of the sulfosuccinate diester as described in example 4. The reaction vessel was heated to 83° C. and an in-situ latex seed was prepared by the addition of 33 g of monomer emulsion (ME) followed by a solution consisting of 1.0 g ammonium persulfate, 0.5 g sodium bicarbonate dissolved in 20 g DI water. The ME was prepared by adding 15.2 g of the sulfosuccinate diester as described in example 4 in 147 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator an exotherm to 85° C. was observed indicating polymerization of the monomers. Dynamic light scattering indicated the in-situ seed average particle size distribution to be 82 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. The resulting latex was pH adjusted from 5.4 to 7.5 with dilute ammonium hydroxide followed by the addition of 0.6 g ACTICIDE® MBS biocide (1:1 (by wt.) of 1,2-benzisothiazolin-3-one and 2-methyl-4-isothiazolin-3-one, Thor Specialties, Inc., Shelton, Conn.). The latex was filtered through a 100 mesh screen, 0.21 g of coagulum was collected on the screen. The reactor was clean—free of coagulum, slight coagulum build-up on stirrer blade. The final average latex particle size was 120 nm.

Example 18

Control Latex Synthesis Using Sodium Lauryl Sulfate Conventional Surfactant

To a 2-L 4-neck round bottom flask equipped with a Teflon agitator blade, nitrogen surface sparge tube, heating mantel and thermocouple connected to a Therm-O-Watch® temperature controller were added 295 g deionized (DI) water and 2.72 g of POLYSTEP® B-5 (Stepan Co., Northfield, Ill.), which is a sodium salt of lauryl sulfate at 29.2% solids The reaction vessel was heated to 83° C. and an in-situ latex seed was prepared by the addition of 43 g of monomer emulsion (ME) followed by a solution consisting of 1.0 g ammonium persulfate, 0.5 g sodium bicarbonate dissolved in 20 g DI water. The ME was prepared by adding 11.5 g of the B-5 described above to 142 g DI water to which was added with vigorous agitation a monomer mixture of 260 g butyl acrylate, 230 g methyl methacrylate and 10 g methacrylic acid and stirred for 10 minutes. Within three minutes after the addition of the ME and ammonium persulfate initiator solution an exotherm to 85° C. was observed indicating polymerization of the monomers. Dynamic light scattering indicated the in-situ seed average particle size distribution to be 46 nm. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. The resulting latex was pH adjusted from 5.5 to 7.5 with 6.6 g of dilute ammonium hydroxide followed by the addition of 0.6 g ACTICIDE® MBS biocide (1:1 by wt.) of 1,2-benzisothiazolin-3-one and 2-methyl-4-isothiazolin-3-one, Thor Specialties, Inc., Shelton, Conn.). The latex was filtered through a 100 mesh screen; 0.6 g of coagulum was collected on the screen. The reactor was clean—free of coagulum build-up. The final average latex particle size was 116 nm.

Example 19

Water Sensitivity Test of Latex Films on Polyester Film

Finished latexes from examples 17 and 18 were drawn down on clear polyester films using a #22 wire wound rod, film A and film B, respectively. The wet films were stored in a 100° C. oven for 3 minutes to dry. The dried films were removed from the oven, stored under ambient conditions for 10 minutes then cut into approximately 2 in.×2 in. squares. The films were stored in 4 oz. jars containing room temperature DI water (~23° C.) for about 24 hours. The films were removed from the jars, wiped dry, placed on black plastic panels and photographed. The latex from example 17 (Film A) became somewhat milky losing some clarity whereas the film from example 18 (Film B) became nearly 100% opaque.

PSA Section

Examples 20-25

PSA Latex Synthesis, General Procedure

To a 2-L 4-neck round bottom flask equipped with a Teflon agitator blade, nitrogen surface sparge tube, heating mantel and thermocouple connected to a Therm-O-Watch® temperature controller were added 301 g deionized (DI) water along with surfactant as listed in Table 3. DI water was added or subtracted in order to keep the total water constant. The reaction vessel was heated to 83° C. and an in-situ latex seed was prepared by the addition of 13.4 g of monomer emulsion (ME) followed by a solution consisting of 1.0 g ammonium persulfate, 0.5 g sodium bicarbonate dissolved in 20 g DI water. The ME was prepared by adding surfactant to 153 g DI water (constant; adjusted based on solids) as listed in Table 3.

To the surfactant solution, a monomer mixture of 370 g 2-ethylhexyl acrylate, 75 g methyl methacrylate, 50 g butyl acrylate, and 5 g methacrylic acid was added with vigorous agitation and stirred for 10 minutes. Within two minutes after the addition of the ME and ammonium persulfate initiator an exotherm to about 84.1° C. was observed indicating polymerization of the monomers. Dynamic light scattering indicated the in-situ seed average particle size distribution of examples 20-25: 38, 36, 38, 45, 33, 45 nm respectively. After 10 minutes, the ME was added by metering pump over a three hour period concurrent with the addition of a solution consisting of 2.7 g ammonium persulfate, 1.5 g sodium bicarbonate dissolved in 75 g DI water. The reaction temperature was maintained at 83° C. After three hours, the ME and initiator feed additions were complete. The ME addition line was flushed with 50 g DI water into the reactor. The reaction was maintained at 83° C. for an additional hour, and then cooled with blown air to room temperature. The resulting latex was pH adjusted from approximately 5.2 to 7.5 with dilute ammonium hydroxide followed by the addition of 0.7 g ACTICIDE® GA biocide (blend of chlorinated and non-chlorinated isothiazolinones and 2-bromo-2-nitro-1, 3 propanediol, Thor Specialties, Inc., Shelton, Conn.). The latex was filtered through a 100 mesh screen. Total reactor coagulum build-up for examples 20-25: 2.7, 0.3, 0.4, 1.0, 0.8, 1.0 grams, respectively. The final average latex particle size for examples 20 to 25: 121, 114, 128, 137, 130, 129 nm, respectively.

TABLE 3

| Example | Surfactant | Solids, % | In-situ Seed Surfactant, grams | Monomer Emulsion Surfactant, grams |
| --- | --- | --- | --- | --- |
| 20 | POLYSTEP TSP-16S | 27.3 | 5.9 | 29.4 |
| 21 | Example #1 | 24.6 | 6.8 | 34.1 |
| 22 | Example #5 | 25.3 | 5.0 | 25.1 |
| 23 | Example #3 | 35.3 | 2.9 | 14.6 |
| 24 | Example #4 | 80.3 | 2.7 | 13.6 |
| 25 | Example #6 | 44.4 | 4.2 | 21.1 |

Example 26

Wetting Ability on Polyester Film

Latex examples 20 (45.8% solids), 21 (45.8% solids), 22 (45.5% solids), 23 (45.6% solids), 24 (46% solids), and 25 (45.8% solids) were applied to corona treated polyester films and surface wetting properties were noted. All latexes required an additional wetting agent to create a uniform continuous polymer film. 15.0 grams of latex was added to a scintillation vial along with dioctyl sulfosuccinate (Aerosol OT-75, 75% solids, Cytec industries, New Jersey) followed by mixing using a vortex mixer. The level to achieve complete surface wetting was noted. Results appear in tables 4 to 9.

TABLE 4

(Example 20)

| Sample # | OT-75, grams | Surface Wetting (Y/N) | % OT-75 on active latex |
| --- | --- | --- | --- |
| 1 | 0 | N | 0 |
| 2 | 0.1 | N | 1.1 |
| 3 | 0.2 | N | 2.2 |
| 4 | 0.3 | N | 3.3 |
| 5 | 0.4 | Y | 4.4 |

TABLE 5

(Example 21)

| Sample # | OT-75, grams | Surface Wetting (Y/N) | % OT-75 on active latex |
| --- | --- | --- | --- |
| 1 | 0 | N | 0 |
| 2 | 0.1 | Y | 1.1 |

TABLE 6

(Example 22)

| Sample # | OT-75, grams | Surface Wetting (Y/N) | % OT-75 on active latex |
| --- | --- | --- | --- |
| 1 | 0 | N | 0 |
| 2 | 0.1 | N | 1.2 |
| 3 | 0.2 | Y | 2.2 |

TABLE 7

(Example 23)

| Sample # | OT-75, grams | Surface Wetting (Y/N) | % OT-75 on active latex |
| --- | --- | --- | --- |
| 1 | 0 | N | 0 |
| 2 | 0.1 | Y | 1.1 |

TABLE 8

(Example 24)

| Sample # | OT-75, grams | Surface Wetting (Y/N) | % OT-75 on active latex |
| --- | --- | --- | --- |
| 1 | 0 | N | 0 |
| 2 | 0.1 | N | 1.1 |
| 3 | 0.2 | N | 2.3 |
| 4 | 0.3 | N | 3.3 |
| 5 | 0.4 | Y | 4.4 |

TABLE 9

(Example 25)

| Sample # | OT-75, grams | Surface Wetting (Y/N) | % OT-75 on active latex |
| --- | --- | --- | --- |
| 1 | 0 | N | 0 |
| 2 | 0.1 | N | 1.1 |
| 3 | 0.2 | Y | 2.2 |

Examples 21 to 25 require 3.3, 2.2, 3.3, 0.0, and 2.2% less surfactant, respectively to wet the polyester surface and produce a continuous uniform film compared to Example 20.

Example 27

Water Sensitivity Test of PSA Latex Films on Polyester Film

Finished latexes from examples 20 to 25 with post added dioctyl sulfosuccinate (levels as described in tables 4 to 9 to achieve complete wetting) were drawn down on clear polyester films using a #22 wire wound rod. The wet films were stored in a 90° C. oven for 5 minutes to dry. The dried films were removed from the oven, stored under ambient conditions for 10 minutes then cut into approximately 2 in.×2 in. squares. The films were placed in separate 4 oz. jars containing 60° C. water for 10 minutes. Film opacity was measured against white and black plastic panels using a Novo-Shade Duo 45/0 opacity/shade meter. The test was run in triplicate along with a blank non-exposed film. The results were expressed in a percent format (black/white)×100 and appear in table 10.

TABLE 10

(Opacity)

| Run | Surfactant/Latex | Opacity, 10 min at 60° C. |
|---|---|---|
| 1 | POLYSTEP TSP-16S/ Example 20 | 7.87 |
| 2 | Example #1/Example #21 | 1.95 |
| 3 | Example #5/Example #22 | 1.24 |
| 4 | Example #3/Example 23 | 0.92 |
| 5 | Example #4/Example 24 | 4.23 |
| 6 | Example #6/Example 25 | 0.88 |

The latex films made from latex emulsions comprising surfactants in accordance with the present technology had less opacity (better optical clarity) than the latex film made from a latex emulsion comprising a prior art surfactant.

The presently described technology and the manner and process of making and using it, are now described in such full, clear, concise and exact terms as to enable one of ordinary skill in the art to which the present technology pertains, to make and use the same. It should be understood that the foregoing describes some embodiments and advantages of the invention and that modifications may be made therein without departing from the spirit and scope of the presently described technology as set forth in the claims. Moreover, the invention has been described with reference to preferred and alternate embodiments. Modifications and alterations will occur to others upon the reading and understanding of the specification. It is intended to include all such modifications and alterations insofar as they come within the scope of the appended claims or equivalents thereof. To particularly point out and distinctly claim the subject matter regarded as the invention, the following claims conclude this specification.

We claim:

1. An emulsion comprising:

a. water;

b. at least one radical-polymerizable monomer; wherein the at least one radical-polymerizable monomer comprises (a) an amount of acrylic acid, methacrylic acid, or a mixture thereof from greater than 0 to 2% by weight based on all monomers, and (b) one or more additional monomers selected from the group consisting of vinyl monomers, acrylate monomers, methacrylatemonomers, and mixtures thereof;

c. a surfactant of one or more compounds defined by formula (I),

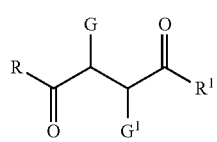

(I)

or a salt thereof, wherein
one of G and $G^1$ is —$SO_3M$ and the other is hydrogen, wherein M is hydrogen or a metal cation;
R is —OH, —$R^1$, or —$R^3$; wherein
each $R^1$ is independently -L-$R^2$, wherein
$R^2$ is

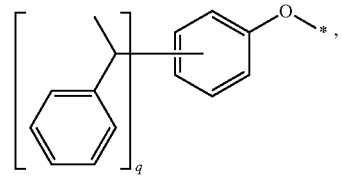

wherein q is 1, 2, or 3, or a mixture thereof;
each L is independently —(OCH($CH_3$)$CH_2$)$_n$—(OCH$_2$CH$_2$)$_m$—*
or —(OCH$_2$CH$_2$)$_m$—(OCH($CH_3$)$CH_2$)$_n$—*, wherein $R^2$ is attached to L at the *; and
n and m are each between 0 and 100, provided that at least one of m and n is greater than or equal to 1; and
$R^3$ is -L-$OR^4$ or $C_{1-30}$ alkoxy, wherein —$OR^4$ is attached to L at the * and $R^4$ is hydrogen or $C_{1-4}$ alkyl.

2. The emulsion of claim 1, wherein the surfactant is one or more compounds according to formula (II),

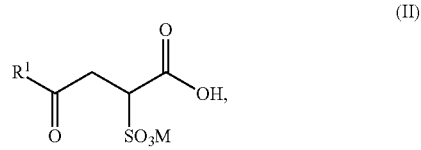

(II)

or a salt thereof.

3. The emulsion of claim 1, wherein the surfactant is one or more compounds according to formula (III),

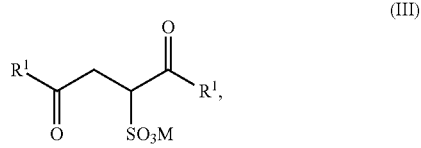

(III)

or a salt thereof, wherein both $R^1$ groups are the same.

4. The emulsion of claim 1, wherein $R^1$ is —(OCH($CH_3$)$CH_2$)$_n$—(OCH$_2$CH$_2$)$_m$—$R^2$.

5. The emulsion of claim 1, wherein $R^1$ is —(OCH$_2$CH$_2$)$_m$—(OCH($CH_3$)$CH_2$)$_n$—$R^2$.

6. The emulsion of claim 1, wherein $R^1$ is —(OCH$_2$CH$_2$)$_m$—$R^2$.

7. The emulsion of claim 1, wherein $R^1$ is —(OCH($CH_3$)$CH_2$)$_n$—$R^2$.

8. The emulsion of claim 1, wherein n and m are each independently from 1 to 50.

9. The emulsion of claim 1, wherein the surfactant is a salt.

10. The emulsion of claim 9, wherein the surfactant is a mono- or di-sodium salt.

11. The emulsion of claim 1, further comprising an initiator.

12. A process for preparing an emulsion polymer latex comprising, polymerizing a monomer emulsion in the presence of an initiator to form an emulsion polymer latex, wherein the monomer emulsion comprises:
a. water,
b. at least one radical-polymerizable monomer; wherein the at least one radical-polymerizable monomer comprises (a) an amount of acrylic acid, methacrylic acid, or a mixture thereof from greater than 0 to 2% by weight based on all monomers, and (b) one or more additional monomers selected from the group consisting of vinyl monomers, acrylate monomers, methacrylate monomers, and mixtures thereof; and
c. a surfactant of one or more compounds defined by formula (I),

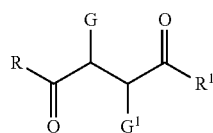
(I)

or a salt thereof, wherein
one of G and $G^1$ is —$SO_3M$ and the other is hydrogen, wherein M is hydrogen or a metal cation;
R is —OH, —$R^1$, or —$R^3$; wherein
each $R^1$ is independently -L-$R^2$, wherein
$R^2$ is

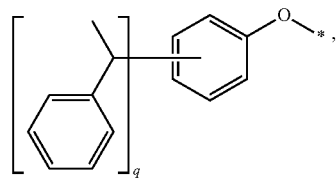

wherein q is 1, 2, or 3, or a mixture thereof;
each L is independently —(OCH($CH_3$)$CH_2$)$_n$—(OCH$_2$CH$_2$)$_m$—*
or —(OCH$_2$CH$_2$)$_m$—(OCH($CH_3$)$CH_2$)$_n$—*, wherein $R^2$ is attached to L at the *; and
n and m are each between 0 and 100, provided that at least
one of m and n is greater than or equal to 1; and
$R^3$ is -L-$OR^4$ or $C_{1-30}$ alkoxy, wherein —$OR^4$ is attached to L at the * and $R^4$ is hydrogen or $C_{1-4}$ alkyl.
13. An emulsion comprising:
a. water;
b. at least one radical-polymerizable monomer;
c. a surfactant of one or more compounds according to formula (IVa) or (IVb),

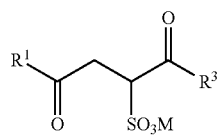
(IVa)

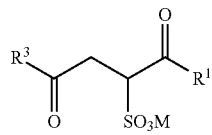
(IVb)

a mixture thereof, or a salt thereof, wherein
wherein M is hydrogen or a metal cation;
each $R^1$ is -L-$R^2$, wherein
$R^2$ is

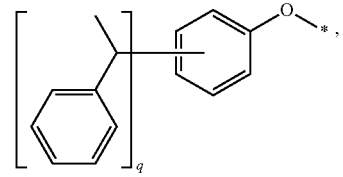

wherein q is 1, 2, or 3, or a mixture thereof;
each L is independently -(OCH($CH_3$)$CH_2$)$_n$—(OCH$_2$CH$_2$)$_m$—*
or —(OCH$_2$CH$_2$)$_m$—(OCH($CH_3$)$CH_2$)$_n$—*, wherein $R^2$ is attached to L at the *; and
n and m are each between 0 and 100, provided that at least
one of m and
n is greater than or equal to 1; and
$R^3$ is -L-$OR^4$ or $C_{1-30}$ alkoxy, wherein —$OR^4$ is attached to L at the * and $R^4$ is hydrogen or $C_{1-4}$ alkyl.
14. The emulsion of claim 13, wherein $R^3$ is -L-$OR^4$.
15. The emulsion of claim 13, wherein $R^3$ is $C_{1-30}$ alkoxy.
16. An emulsion comprising:
a. water;
b. at least one radical-polymerizable monomer; wherein the at least one radical-polymerizable monomer comprises (a) an amount of acrylic acid, methacrylic acid, or a mixture thereof from greater than 0 to 2% by weight based on all monomers, and (b) one or more additional monomers selected from the group consisting of vinyl monomers, acrylate monomers, methacrylate monomers, and mixtures thereof;
c. a surfactant of one or more compounds defined by formula (I),

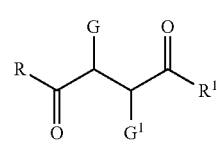
(I)

or a salt thereof, wherein
G is —$SO_3M$ and $G^1$ is hydrogen, wherein M is hydrogen or a metal cation; R is —OH or —$R^1$; wherein each $R^1$ is independently -L-$R^2$, wherein $R^2$ is

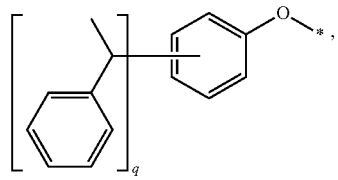

wherein q is a mixture of 1, 2, and 3;

each L is independently —(OCH(CH$_3$)CH$_2$)$_n$—(OCH$_2$CH$_2$)$_m$—* or —(OCH$_2$CH$_2$)$_m$—(OCH(CH$_3$)CH$_2$)$_n$—*, wherein $R^2$ is attached to L at the *; and n and m are each between 0 and 100, provided that at least one of m and n is greater than or equal to 1; and wherein the surfactant is defined by:

a. R is —OH, G is —SO$_3$Na, $G^1$ is hydrogen, m is 16, n is 0, and q is a mixture of 1, 2, and 3;
b. R is —OH, G is —SO$_3$Na, $G^1$ is hydrogen, m is 4, n is 0, and q is a mixture of 1, 2, and 3;
c. R is —OH, G is —SO$_3$Na, $G^1$ is hydrogen, m is 16, n is 1.5, and q is a mixture of 1, 2, and 3;
d. R is $R^1$, G is —SO$_3$Na, $G^1$ is hydrogen, m is 8, n is 0, and q is a mixture of 1, 2, and 3;
e. R is —OH, G is —SO3Na, $G^1$ is hydrogen, m is 8, n is 0, and q is a mixture of 1, 2, and 3; or f. R is —OH, G is —SO3Na, $G^1$ is hydrogen, m is 7, n is 8, and q is a mixture of 1, 2, and 3;

or a salt thereof.

* * * * *